United States Patent [19]
Sudhakar

[11] Patent Number: 5,770,046
[45] Date of Patent: Jun. 23, 1998

[54] SELECTIVE HYDRODESULFURIZATION OF CRACKED NAPHTHA USING NOVEL CATALYSTS

[75] Inventor: Chakka Sudhakar, Fishkill, N.Y.

[73] Assignee: Texaco Inc, White Plains, N.Y.

[21] Appl. No.: 573,789

[22] Filed: Dec. 18, 1995

Related U.S. Application Data

[63] Continuation-in-part of Ser. No. 407,425, Mar. 17, 1995, Pat. No. 5,538,930.

[51] Int. Cl.⁶ ........................................... C10G 45/04
[52] U.S. Cl. ...................... 208/216 R; 208/213; 208/217; 208/143
[58] Field of Search ............................... 208/213, 216 R, 208/216 PP, 217, 143

[56] References Cited

U.S. PATENT DOCUMENTS

| | | | |
|---|---|---|---|
| 3,836,453 | 9/1974 | Kovach et al. | 208/143 |
| 5,423,976 | 6/1995 | Sudhakar et al. | 208/216 R |
| 5,441,630 | 8/1995 | Dai et al. | 208/216 PP |
| 5,459,118 | 10/1995 | Dai et al. | 502/300 |

*Primary Examiner*—Walter D. Griffin
*Attorney, Agent, or Firm*—Henry H. Gibson; Carl G. Ries

[57] ABSTRACT

Hydrodesulfurization of cracked naphtha, with minimum attendant hydrogenation of olefins, is effected over a sulfided, carbon supported catalyst bearing (i) at least one non-noble Group VIII metal, (ii) at least one Group VI-B metal, (iii) at least one metal of Group I-A, II-A, III-B, or the lanthanide series of rare earths, and (iv) at least one metal of Group I-B.

19 Claims, No Drawings

SELECTIVE HYDRODESULFURIZATION OF CRACKED NAPHTHA USING NOVEL CATALYSTS

CROSS REFERENCE

This application is a continuation-in-part of U.S. application Ser. No. 08/407,425 filed Mar. 17, 1995, now U.S. Pat. No. 5,538,930 and is related to U.S. Pat. No. 5,423,976, incorporated by reference herein in its entirety.

FIELD OF THE INVENTION

This invention relates to hydrotreating of cracked naphtha. More particularly it relates to a process for selectively deep hydrodesulfurizing a cracked naphtha containing olefins under conditions to minimize saturation of the olefin content and to a novel selective hydrodesulfurization catalyst.

BACKGROUND OF THE INVENTION

It is well known that air pollution is a serious environmental problem. A major source of air pollution worldwide is the exhaust from fuel combusted in hundreds of millions of motor vehicles. Regulations have been enacted reflecting the need to reduce harmful motor vehicle emissions through more restrictive fuel standards. Fuels containing sulfur produce sulfur dioxide and other pollutants which lead to a host of environmental concerns, such as smog and related health issues, acid rain leading to deforestation, and water pollution, as well as a number of other environmental problems. In addition, the sulfur compounds in the exhaust gases of the automobiles are detrimental to the efficient functioning of the catalytic converter in the automobile, leading to increased pollution. To help reduce or eliminate these environmental problems, the sulfur content of fuels has been, and will continue to be, restricted to increasingly smaller concentrations, such as, for example less than 100 or even 50 parts per million (ppm).

The problem of sulfur in fuels is compounded in many areas where there are diminishing or no domestic sources of crude oil having relatively low sulfur content. For example, in the United States the supply of domestic oil production relies increasingly on lower grade crude oil with higher sulfur content. The need for lower sulfur content fuel therefore increases demand for imported oil having lower sulfur content, thereby increasing trade imbalance and vulnerability due to dependence on foreign sources of oil.

The sulfur content in crude oil can take the form of a wide variety of both aliphatic and aromatic sulfurous hydrocarbons. Various techniques have been developed for removing sulfur compounds.

One such technique, called catalytic hydrodesulfurization (HDS), involves reacting hydrogen with the sulfur compounds in the presence of a catalyst. The general HDS reaction is illustrated in Equation 1.

Equation 1: Hydrodesulfurization Reaction

In Equation 1, the sulfur compound, RSR', can be: a thiol or mercaptan, where R is hydrocarbyl and R' is hydrogen; a sulfide or disulfide, where the sulfur is connected to another sulfur atom in R or R' hydrocarbyl groups; or can be a thiophene where R and R' are connected to form a heterocyclic ring. The HDS reaction consumes hydrogen ($H_2$) and produces hydrogen sulfide ($H_2S$) and hydrocarbons. The hydrogen sulfide can then be separated to give a petroleum product in which the sulfur is significantly reduced or substantially eliminated.

HDS is one process within a class of processes called hydrotreating, or hydroprocessing, involving the introduction and reaction of hydrogen with various hydrocarbonaceous compounds. Some of the other reactions that take place simultaneously during the hydrotreating process are hydrodenitrogenation (HDN), which is the removal of nitrogen in the carbonaceous compounds containing nitrogen as ammonia, hydrodeoxygenation (HDO), which is the removal of oxygen from carbonaceous compounds containing oxygen as water, and hydrogenation (HYD) of unsaturated hydrocarbons such as olefins and aromatics.

The hydrotreating reactions can occur simultaneously to various degrees when sulfur-, oxygen-, and nitrogen-containing and unsaturated compounds are present in the petroleum. The hydrotreating reactions are exothermic, producing heat. Such hydrotreatment has been used to remove not only sulfur, but to also remove nitrogen and other materials like metals, not only for environmental considerations but for other reasons, such as to protect catalysts used in subsequent processing from being poisoned by such elements. See, for example, Applied Industrial Catalysis, Volume I, edited by B. E. Leach, Academic Press (1983); Chemistry of Catalytic Processes, by B. C. Gates et al., McGraw-Hill (1979); and Applied Heterogeneous Catalysis: Design Manufacture Use of Solid Catalysts, by J. F. LePage et al., Technip, Paris (1987).

As is well known to those skilled in the art, cracked naphtha obtained as a product of a cracking operation or a coking operation may contain a significant concentration of sulfur—up to as much as 13,000 wppm. Though this stream constitutes only 35–40% of the total gasoline pool, it contributes a substantial quantity of undesired sulfur to the gasoline pool. The other 60–65% of the pool typically contains much lower quantities of sulfur. It is possible to decrease the sulfur content by (i) hydrotreating the entire feedstock to the cracking/coker unit or (ii) hydrotreating the product naphtha from these units.

The first noted alternative is a "brute force" effort that is very expensive in that it requires a large hydrotreater, and it consumes significant quantities of hydrogen. The second noted alternative is a more direct approach, that is to hydrodesulfurize the cracked naphtha. But unfortunately HDS of naphtha using standard hydrotreating catalysts under conditions required for sulfur removal results in undesirable saturation of the olefins typically originally present in amount of 20 v %–60 v %, down to levels as low as 2 v %; and this reduces the octane number (Octane Number is the average of the Research Octane Number RON and the Motor Octane Number MON) of the product gasoline by as much as 10 units. This loss in octane number associated with desulfurization has a significant impact on the octane number of the refinery gasoline pool. The lower grade fuel probably also needs more refining, such as isomerization, blending, or other refining, to produce higher octane fuel, adding significantly to production expenses.

Selective HDS to remove sulfur while minimizing hydrogenation of olefins and octane reduction by various techniques, such as selective catalysts, has been described in literature. For example, U.S. Pat. No. 4,132,632 (Yu et al.) and U.S. Pat. No. 4,140,626 (Bertolacini et al.)—both assigned to Standard Oil Company (Indiana), disclose selective desulfurization of cracked naphthas by using specific catalysts having particular amounts of Group VI-B and VIII metals on magnesia containing support which is at least 70 wt % magnesium oxide and which may also contain other refractory inorganic oxides such as alumina, silica, or silica/alumina. U.S. Pat. Nos. 5,266,188 and 5,348,928 (Kukes et al.) assigned to Amoco Corporation disclose the use of novel catalysts comprising a hydrogenation component and a support component, for selective HDS. The hydrogenation component of these novel catalysts comprises a Group VI-B metal and a Group VIII metal, and the support component comprises from about 0.5 wt % to about 50 wt % of a magnesium component and from about 0.02 wt % to about 10 wt % of an alkali metal component.

U.S. Pat. No. 4,334,982 of Jacquin et al. assigned to Institute Francais du Petrole, disclosed the use of catalysts comprising cobalt and molybdenum or tungsten supported on low surface area low acidity oxide supports, the atomic ratio of cobalt to the total metals being greater than 0.55 in these catalysts, for selectively desulfurizing hydrocarbon cuts of high olefin content without significant loss in octane number. Use of alkali or alkaline earth metals in the catalyst was not suggested.

U.S. Pat. No. 5,340,466 of Dai et al. assigned to Texaco Inc. discloses the use of novel catalysts comprising an alkali metal, a metal of Group VIII, and a metal of Group VI-B on an alumina support containing hydrotalcite-like composition, for the selective HDS of cracked naphtha. U.S. Pat. No. 5,358,633 of Dai et al. assigned to Texaco Inc. discloses the use of transition alumina bearing Group VIII metal oxide and a Group VI-B metal oxide as selective HDS catalysts, the atom ratio of Group VIII metal to Group VI-B metal being 1–8 in these catalysts.

U.S. Pat. No. 5,423,976 of Sudhakar et al. assigned to Texaco Inc. discloses the use of sulfided, carbon supported catalyst bearing (i) a non-noble Group VIII metal, (ii) a Group VI-B metal, and (iii) a metal of Group I-A, II-A, III-B, or a lanthanide, for HDS of cracked naphtha with minimum attendant hydrogenation of olefins that are present in the naphtha.

U.S. Pat. Nos. 5,286,373 and 5,423,975 of Sudhakar et al. assigned to Texaco Inc. disclose the use of highly deactivated hydrotreating catalysts and spent reside upgrading catalysts, without regenerating them, for the selective HDS of cracked naphthas with minimal olefin saturation and octane loss.

It would be desirable to have an efficient process for removing sulfur from olefin containing fuel feedstocks, like naphtha. A process which minimizes loss of octane value using an inexpensive procedure under a wide range of conditions, would contribute to a cleaner environment.

It would be especially advantageous if the process was selective HDS, because it consumes a lower level of hydrogen compared to normal HDS or hydrotreating operations. This is a result of the low level of hydrogenation due to low catalytic hydrogenation activity. This would save not only on the cost of hydrogen but provides improved operation and control of the HDS reaction due to lower reaction heat generation compared with using fresh hydrotreating catalyst. If the process could be operated at lower pressures than standard HDS reactions, the process would be even more desirable commercially.

It has now been found that the catalysts of U.S. Pat. No. 5,423,976 can be improved significantly by supplementally promoting them with a metal of Group I-B. It is an object of this invention to provide a novel catalyst, and process for hydrotreating a charge cracked naphtha.

It is another object of the present invention to provide a novel catalyst and process that reduce cracked naphtha diene concentration significantly.

It is yet another object of the present invention to provide a novel catalyst and process that yields gasoline of less color and improved stability.

An additional advantage of the selective HDS of the present invention is the ability to operate the HDS process at lower pressures than standard HDS reactions. This provides a significant cost savings.

Other objects will be apparent to those skilled in the art.

STATEMENT OF THE INVENTION

In accordance with certain of its aspects this invention is directed to a process for treating a charge cracked naphtha containing olefinic components and undesired sulfur which comprises maintaining a bed of sulfided, carbon supported catalyst containing (i) a metal of non-noble Group VIII, and (ii) a metal of Group VI-B, and (iii) a metal of Group I-A, II-A, III-B, or a lanthanide, and (iv) a metal of Group I-B;

passing a charge cracked naphtha containing olefinic components and undesired sulfur into contact with said catalyst along with hydrogen;

maintaining said charge cracked naphtha containing olefinic components and undesired sulfur in contact with said catalyst and hydrogen at hydrodesulfurizing conditions thereby effecting hydrodesulfurization of said charge cracked naphtha containing olefinic components and undesired sulfur and forming a product stream of desulfurized naphtha containing a decreased content of sulfur; and recovering said product stream of cracked naphtha containing a decreased content of sulfur.

DESCRIPTION OF THE INVENTION

The charge hydrocarbon which may be treated by the process of this invention may include those which are commonly designated as cracked naphthas and include light cracked naphtha (boiling range of about $C_5$ to about 330° F.), a full range cracked naphtha (boiling range of about $C_5$ to about 420° F. or higher), heavy cracked naphtha (boiling range of about 330° F., up to 500° F.), etc. These hydrocarbons which are in the gasoline boiling range, are typically recovered from thermal or catalytic cracking or coking operations and are generally passed to the gasoline pool. Examples include light, full range and heavy fluid catalytic cracked (FCC) naphthas, light, full range and heavy coker naphthas, and gasoline range hydrocarbon fractions from visbreaker operations.

Highly unsaturated hydrocarbon fractions boiling in the range of gasoline called "pyrolysis gasolines" are produced in petrochemical plants or refineries. Pyrolysis gasolines contain significant concentrations of olefins, and therefore are suitable feeds for the selective HDS process of the present invention. The hydrocarbon fractions called "steam cracking effluents" which contain significant concentrations of olefins and boil in gasoline range are also suitable to be treated using the novel catalysts and process of the present invention.

The cracked naphthas may also be supplemented with higher boiling range distillate feedstocks to form a mix feed for the process and catalysts of the present invention. Among the distillate feeds that are suitable for this purpose include, but are not limited to light catalytic gas oils (LCGO), also called light catalytic cycle oils (LCCO), light coker gas oils (LKGO), straight run kerosine and light gas oils, etc. After the selective HDS of the mix feed, the naphtha portion can be separated by distillation, and directed into the gasoline pool.

The charge cracked naphtha hydrocarbons may be commonly characterized by the following properties given below in

TABLE 1

| Property | Broad Range | Preferred Range |
|---|---|---|
| API Gravity ° | 50–80 | 50–70 |
| Boiling Range °F. | | |
| Initial boiling point | 50–280 | 70–200 |
| 10 v % | 70–300 | 100–250 |
| 50 v % | 150–310 | 190–290 |
| 90 v % | 200–450 | 220–400 |
| End Point | 200–500 | 250–450 |
| Sulfur content (wppm) | 200–13,000 | 600–10,000 |
| Nitrogen content (wppm) | 0–500 | 5–200 |
| Olefin content (v %) | 5–60 | 10–50 |
| Aromatics content (v %) | 5–50 | 8–45 |
| Diene content (wt %) | 0.01–15 | 0.1–5 |
| Research Octane Number (RON) | 60–100 | 70–95 |

The novel catalysts of the present invention may also be advantageously utilized for selectively hydrodesulfurizing olefin containing naphtha boiling range hydrocarbon streams which are derived from coal liquefaction, shale oils, sand oils or any other type of synthetic carbonaceous fuels.

The novel catalysts of the present invention may also be advantageously utilized for hydrodesulfurizing straight run heavy naphtha, and middle distillate feedstocks such as light gas oils, and light and heavy kerosines, regardless of the origin of those middle distillates. For example, light gas oils produced in delayed cokers, fluid catalytic crackers, mild hydrocrackers, or straight run from crude, can be hydrodesulfurized using the catalysts of the present invention. The novel catalysts of the present invention may also be advantageously utilized for hydrodesulfurization in "blocked operation" mode. For example, a hydrotreating reactor containing the novel catalyst of the present invention can be used to selectively desulfurize cracked naphtha for a certain period of time, then the operation can be switched to desulfurize a middle distillate such as a light gas oil for a certain period of time, and then switched back again to selectively desulfurize cracked naphtha.

The process and the novel catalyst compositions of the present invention may also be utilized for selectively hydrogenating dienes to mono-olefins under suitable reaction conditions. Use of these catalysts for this particular application would be as a guard bed catalyst in any catalytic process that is affected adversely by the presence of diene impurities in the feed for that catalytic process. Examples of such catalytic processes which may benefit by the novel catalyst compositions of the present invention include paraffin and olefin isomerization processes, olefin skeletal isomerization processes, etherification processes which involve reaction of branched olefin containing streams with alcohols, and the like.

We have noted from our experience that the novel catalysts and the process of the present invention are excellent for producing fuels which are almost "water white", and therefore will be useful for producing gasoline, kerosine or diesel fuel having significantly less color.

Since a substantial portion of the original olefin content is not saturated in the selective HDS process of the present invention, some of these olefins which are left behind react with the hydrogen sulfide formed in the hydrodesulfurization reaction, to form mercaptans. This is called recombination reaction. These mercaptans formed by the recombination reaction and existing in the product desulfurized naphtha may be removed or converted to disulfides by subsequently subjecting the product naphtha to a known mercaptan removal or oxidation process to remove the mercaptans and get a desulfurized naphtha product of lesser sulfur content. Alternatively, the disulfides can be left behind in the product if the total sulfur concentration meets the specifications. There are several mercaptan removal and oxidation processes, such as the Merox process, known in the literature.

In practice of the process of this invention for selective HDS of cracked naphtha, the charge cracked naphtha is admitted to the catalyst bed and maintained therein at the conditions following, listed in Table 2:

TABLE 2

| Condition | Broad Range | Preferred Range | Typical |
|---|---|---|---|
| Temperature °F. | 400–750 | 500–700 | 550 |
| Total Pressure (psig) | 200–1000 | 250–600 | 400 |
| Hydrogen feed rate (SCFB) | 100–6,000 | 500–4,000 | 2,000 |
| Liquid Hourly Space Velocity (hr$^{-1}$) | 1–15 | 2–10 | 4 |
| Hydrogen Purity (v %) | 60–100 | 80–99 | 95 |

The process of the present invention may be effected in any type of reactor system such as fixed bed reactor system, ebullated bed reactor system, fluidized bed reactor system, moving bed, slurry reactor system, and the like. In the case of fixed bed reactor system, the reaction zone may consist of one or more fixed bed reactors and may comprise a plurality of catalyst beds. It is preferred to use extrudates, pellets, pills, spheres or granules of the catalyst in a fixed bed reactor system, preferably under conditions where substantial feed vaporization occurs. However, the finished catalysts of the present invention can be in any physical form described above, as well as powder.

The supported catalyst of this invention is preferably prepared on an activated carbon support. All carbons with B.E.T. surface areas of generally more than 200 m$^2$/g, derived from any raw material such as coal, wood, peat, lignite, coconut shell, olive and other fruit pits, synthetic polymers, coke, petroleum pitch, coal tar pitch, etc., are suitable as catalyst supports for the catalysts of the present invention. Carbon is generally characterized as "activated" if it contains an intricate network of internal porosity arising from the activation process.

The activated carbon support used for making the catalysts of this invention may exist in any physical form including, but not limited to powder, pills, granules, pellets, spheres, fibers, monolith, foams, or extrudates. It may contain a small concentration of phosphorus of the order of about 2 wt. % or less, as a consequence of its manufacturing process. It may also contain one or more refractory inorganic oxides as minor components which may arise as a result of the carbon's inherent composition (ash), or as a result of using some binding materials for forming (or shaping) the carbon material, total of these being less than about 25 wt. %.

Typical carbons which may be employed may possess the following characteristics listed in Table 3:

TABLE 3

| Property | Broad Range | Preferred Range | Typical |
|---|---|---|---|
| Surface Area by Nitrogen B.E.T., $m^2/g$ | 200–2,000 | 400–1,800 | 1,100 |
| Total Pore Volume (TPV) for $N_2$, cc/g | 0.2–1.5 | 0.4–1.2 | 0.7 |
| Average Pore Diameter by $N_2$ Physisorption, Angstroms | 8–200 | 8–50 | 22 |
| Apparent Bulk Density, g/cc | 0.2–1.0 | 0.3–0.8 | 0.5 |
| Ash Content, wt % | 0.01–25 | 0.1–15 | 6 |
| Particle Diameter, mm | 0.1–6 | 0.5–4 | 1.5 |

Illustrative commercially available carbon pellets, granules, or extrudates which may be used as catalyst supports in fixed beds in practice of the process of this invention may include:

TABLE 4

A. 3 mm. (or 0.8 mm) extrudate of RX Series brand (of Norit Company) activated carbon: BET Surface Area 1400 $m^2/g$; Total Pore Volume 0.8 cc/g; Average Pore Diameter estimated using the Wheeler equation $$\text{Average Pore Diameter (Å)} = [40{,}000 \times \text{TPV (cc/g)}]/\text{Surface Area (m}^2/\text{g)} \text{ of 22.4 Angstroms;}$$

Apparent Bulk Density 410 g/l; Ash Content 4.0 wt %; 2.9 mm (or 0.8 mm) particle diameter.

B. 0.8 mm extrudate of RO Series brand (of Norit Company) activated carbon: BET Surface Area 1510 $m^2/g$; Total Pore Volume 0.98 cc/g; Average Pore Diameter 25.9 Angstroms; Apparent Bulk Density 400 g/l; Ash Content 6.0 wt %; 0.8 mm particle diameter.

C. 1.4 mm extrudate of RO3515 Series brand (of Norit Company) activated carbon; BET Surface Area 1100 $m^2/g$; Total Pore Volume 0.52 cc/g; Average Pore Diameter 19 Angstroms; Apparent Bulk Density 475 g/l; Ash Content 9.0 wt %; 1.4 mm particle diameter.

D. Nuchar BX-7530 carbon obtained from the Westvaco Company as 1/8" pellets, having a Brunauer-Emmett-Teller (BET) surface area of 1128 $m^2/g$, a nitrogen pore volume (TPV) of 0.82 cc/g (for nitrogen), Average Pore Diameter of 29.2 Å calculated from nitrogen physisorption data, an apparent bulk density of 370 g/l and an ash content of less than 7 wt %.

Commercially available activated carbons may be modified by suitable chemical and physical processes before using them as catalyst supports for the catalysts of the present invention. Suitable chemical treatments to modify the surface chemistry of the carbons can be any treatment which does not significantly alter the physical properties of the carbon such as its surface area, or its pore size distribution, but changes its surface chemical properties such as their acidity, basicity, surface oxygen containing groups and their concentrations, etc. Examples of such treatments to modify the surface chemistry of carbons are provided in "Chemistry and Physics of Carbon", Vol. 24, page 213- , Edited by Peter A. Thrower, Marcel Dekker, 1994, in the article entitled "Interfacial Chemistry and Electrochemistry of Carbon Surfaces", by L. R. Radovic and Carlos Leon y Leon. Examples of physical treatments to alter properties such as the surface area and pore size distribution of the carbons are available in "Chemistry and Physics of Carbon", Vol. 21, page 1, Edited by Peter A. Thrower, Marcel Dekker, 1991, in the article entitled "Microporous Structures of Activated Carbons as revealed by Adsorption Methods", by F. Rodreguiz-Reinoso et al. Some physical treatments such as heating the carbon in air, inert atmosphere, or vacuum at high temperatures as high as 2000° C., modify the physical as well as the surface chemical properties of the carbons, and therefore are included as suitable carbon support pretreatments for the catalysts of the present invention.

It is a particular feature of the carbon supports which may be used in practice of one aspect of the catalysts and process of this invention that they contain at least 0.01 wt %, typically 0.01–20 wt %, preferably 0.1–15 wt %, say about 1 wt % for potassium and 5 wt % for La of a "hydrogenation suppressor" metal of Group I-A or II-A (the alkali metals or the alkaline earth metals) or of Group III-B, or a metal of the lanthanide series of atomic number 57–71. When the metal is an alkali metal, it may be sodium Na, potassium K, lithium Li, Cesium Cs, or Rubidium Rb—preferably potassium K. When the metal is an alkaline earth metal, it may be Magnesium Mg, Barium Ba, Calcium Ca, or Strontium Sr,—preferably Calcium Ca. When the metal is a lanthanide, it may typically be La, Ce, Pr, Nd, Sm, Eu, Gd, Tb, Dy, Ho, Er, Tm, Yb or Lu—preferably Lanthanum La. Group III-B metals preferably include Sc and Y. When the charge carbon support does not contain any of these metals, they can be incorporated into the catalyst at any stage of the catalyst preparation. It should be noted here that these metals referred to above as "metals", usually exist as some compound(s) of the metal, such as the metal oxide, nitrate, sulfate, carbonate, ammonium salt, chloride etc., and should not be confused with elemental metals. The weight % specification, however, is based on the calculation as "metal", and not as "oxide" or any other metal compound.

The carbon support may contain more than one "hydrogenation suppressor" metal of each Group or it may contain metals from more than one of the Groups. Alkali metals are the preferred "hydrogenation suppressor" metals. The metal is typically added as a salt e.g. sodium acetate, potassium hydroxide, potassium carbonate, $K_2SO_4$, magnesium nitrate, $La(NO_3)_3$, potassium sulfide or polysulfide, or $YCl_3$; and it may be added dry or in the form of an aqueous or non-aqueous solution or suspension. In general, any known inorganic, organic or organometallic compounds of the Group I-A metal can be used as precursors for the Group I-A metal in the final catalyst. The carbon which is employed may typically contain some of the metals e.g. alkali metals such as Na or K, in which case the "hydrogenation suppressor" metal may not be added deliberately, to prepare the final catalyst.

The "hydrogenation suppressor" metal may also be loaded onto the carbon support when the latter is being prepared—i.e. admixed with the carbon and the other components prior to extrusion or casting. More preferably however it is added by deposition onto the carbon pellet or granule from aqueous or non-aqueous solutions by any known deposition technique such as equilibrium adsorption, incipient wetness impregnation, pore filling, ion exchange, etc. Typically the carbon pellet may be impregnated to incipient wetness with an aqueous solution containing e.g. sodium acetate, potassium acetate, potassium carbonate, calcium nitrate, etc. and heated in air or inert atmosphere at a temperature of 100° C.–1000° C.

The so-loaded carbon may then be further treated to deposit the remaining catalytic metals on the carbon, either sequentially or simultaneously, by various processes known to those skilled in the art, including ion exchange, pore filling, incipient wetness impregnation, equilibrium adsorption, etc. from aqueous or non-aqueous media.

Expressed as elemental Group I-B metal, the Group I-B metal can exist in an amount of 0.01 to 10% by weight of the total catalyst and preferably about 0.1 to 6% by weight. In general, any known inorganic, organic or organometallic compounds of the Group I-B metal can be used as precursors for the Group I-B metal in the final catalyst. Suitable compounds include, but are not limited to the nitrate, sulfate, acetate, naphthenate, and chloride of the Group I-B metal. Copper is the preferred Group I-B metal. The catalyst may contain more than one of the Group I-B metals.

The Group VI-B metal may be tungsten or more preferably molybdenum—present in the final catalyst in amount of 0.1–40 wt %, preferably 0.5–30 wt % say 6 wt % for Mo and preferably 15 wt % for W. In general, any known inorganic, organic or organometallic compounds of the Group VI-B metal can be used as precursors for the Group VI-B metal in the final catalyst. Suitable compounds include, but are not limited to the oxide, acetate, naphthenate, dialkyldithiocarbamate, ammonium salts such as ammonium heptamolybdate or ammonium metatungstate, ammonium tetrathiomolybdate, molybdo-and tungsto-phosphoric acids, carbonyl compounds, and chloride of the Group VI-B metal. Molybdenum is the preferred Group VI-B metal. The catalyst may contain more than one of the Group VI-B metals. Compounds such as potassium molybdate may be used as the precursor for molybdenum, with the added advantage in this case that the "hydrogenation suppressor" metal potassium is also incorporated into the catalyst at the same time.

The non-noble Group VIII metal may preferably be nickel Ni or more preferably cobalt Co—present in the final catalyst in amount of 0.1–15 wt %, preferably 0.1–10 wt %, say 2 wt %. In general, any known inorganic, organic or organometallic compounds of the Group VIII metal can be used as precursors for the Group VIII metal in the final catalyst. Suitable compounds include, but are not limited to the nitrate, sulfate, acetate, naphthenate, dialkyldithiocarbamate, ammonium salts, carbonyl compounds, sulfate, sulfamate, and chloride of the Group VIII metal. Cobalt is the preferred Group VIII metal. The catalyst may contain more than one of the Group VIII metals.

The Group VI-B metal may be loaded onto the catalyst support from a preferably aqueous solution of ammonium heptamolybdate or of ammonium metatungstate. The Group VIII metal may be loaded onto the catalyst support from a preferably aqueous solution of nickel nitrate or of cobalt nitrate. However, in general, any known and easily available inorganic, organic or organometallic compounds of the Group VI-B and Group VIII metals may be used as precursors for the Group VI-B and Group VIII metals in the final catalyst.

Though the sequence in which the various metals are deposited on the carbon is not critical, it is preferred to deposit the "hydrogenation suppressor" metal first, followed by the Group VI-B metal, and thereafter the Group VIII metal together with the Group I-B metal is deposited, with a drying and preferably calcining steps in between. In another embodiment, the Group VI-B metal and the "hydrogenation suppressor" metal can be deposited simultaneously onto the carbon support in a single step from an aqueous or non-aqueous solution. After the drying or calcining step, the Group VIII metal and the Group I-B metal can be deposited simultaneously onto the carbon support bearing the Group VI-B metal and the "hydrogenation suppressor" metal, followed by the final drying or calcining step. In yet another embodiment, the Group VI-B metal is deposited first, followed by the Group VIII metal together with the Group I-B metal in the second step, which is followed by the deposition of the "hydrogenation suppressor" metal in the final deposition step. All the catalytic metal components may also be deposited on the carbon support in just one step. For example, an aqueous solution prepared by dissolving potassium nitrate, ammonium molybdate, copper (II) nitrate, and cobalt (II) nitrate in water may be used to deposit the catalytic metals on the carbon support in just one step. The metals deposited carbon may then be dried and optionally calcined.

When aqueous solutions are used to deposit the catalytic metals either individually or more than one at the same time, the pH values of the aqueous solutions may be adjusted to desired values before metals deposition. As is well known to those skilled in the art, the pH of an aqueous solution containing catalytic metals may need adjusting to a desired value before it is used for metals deposition on a catalyst support.

In a preferred embodiment, the carbon support is contacted with an aqueous solution of potassium carbonate in amount sufficient to fill the pores to incipient wetness. The so-treated support is dried at 20° C.–150° C., say 115° C. for 16–24 hours, say 20 hours followed by calcination in air or inert atmosphere at 200° C.–650° C., say 250° C., for 2–6 hours, say 3 hours. Product carbon contains say, 2 wt % of K.

Thereafter the carbon support bearing potassium is contacted with an aqueous solution of Group VI-B metal e.g. ammonium heptamolybdate tetrahydrate in amount sufficient to fill the pores to incipient wetness. The support is then dried at 20° C.–150° C., say 115° C. for 16–24 hours, say 20 hours followed by calcination at 200° C.–650° C., say 250° C. for 2–6 hours, say 3 hours in air or inert atmosphere.

Thereafter the carbon support bearing potassium and molybdenum is contacted with an aqueous solution made up of a Group VIII metal e.g. cobalt (II) nitrate hexahydrate and a Group I-B metal e.g. copper (II) nitrate trihydrate in amount sufficient to fill the pores to incipient wetness. The support bearing the Group I-A metal, Group VI-B metal, the Group VIII metal, and the Group I-B metal is dried at 20° C.–150° C., say 115° C. for 16–24 hours, say 20 hours followed by calcination at 200° C.–650° C., say 300° C. for 2–6 hours, say 3 hours in air or inert atmosphere.

The desired selective HDS of the charge cracked naphtha according to this invention is accomplished by use of a catalyst prepared from a carbon support characterized by a nitrogen BET surface area of 200–2,000 m$^2$/g, by a Total Pore Volume of 0.2 to 1.5 cc/g, and by an average Pore Diameter of 8–200 Å which has deposited thereon 1–40 wt % of Group VI-B metal, 0.1–15 wt % of non-noble Group VIII metal, 0.01–20 wt % of one or more "hydrogenation suppressor" metals selected from the group consisting of Group I-A, Group II-A, Group III-B, and the Lanthanides, and 0.01–10 wt % of Group I-B metal, based on the final catalyst weight. The catalysts of the present invention may also contain additional promoters known to those skilled in the art of hydrotreating, such as phosphorus, boron or fluoride, at 0.01% to 4% by weight, calculated as elemental phosphorus, boron or fluorine respectively, based on the total catalyst weight.

The catalytic metals may be deposited on the carbon, in the form of inorganic, organic or organometallic compounds of the metals, either sequentially or simultaneously, by various processes known in the art including incipient wetness impregnation, equilibrium adsorption etc., from aqueous or non-aqueous media, or from vapor phase using volatile compounds of the metals. The catalysts can also be prepared by solid state synthesis techniques such as, for example, grinding together the support and the metal compounds in a single step or in multiple steps, with suitable heat treatments, followed by subsequent extrusion or pelletizing. It is to be noted that in the as-prepared catalysts, the catalytic metals exist as oxides or as partially decomposed or partially reacted metal compounds.

The carbon supported catalyst so prepared, contains the following (wt % metal, based on final catalyst weight), shown in Table 5:

TABLE 5

| Component | Broad Range | Preferred Range | Typical |
|---|---|---|---|
| "Hydrogenation Suppressor" Group I-A/II-A/III-B/ Lanthanide | 0.01–20 | 0.1–15 | 1, for K 5, for La |
| Group VI-B | 0.1–40 | 0.5–30 | 6, for Mo |
| Group VIII | 0.1–15 | 0.1–10 | 2, for Co |
| Group I-B | 0.01–10 | 0.1–6 | 2, for Cu |

The catalyst, prepared as described, may then be sulfided to a significant extent, preferably after loading into the hydrodesulfurization reactor. The catalyst sulfiding may be accomplished using any method known in the art such as, for example, by heating the catalyst in a stream of hydrogen sulfide in hydrogen or by flowing an easily decomposable sulfur compound such as carbon disulfide, di-t-nonylpolysulfide (TNPS) or dimethyl disulfide with or without a hydrocarbon solvent, over the catalyst at elevated temperatures up to, but not limited to 500° C. at atmospheric or higher pressures, in the presence of hydrogen gas for 2–24 hours, say 3 hours.

Alternatively, the catalyst sulfiding may also be effected by the sulfur compounds present in the hydrocarbon charge to be hydrotreated. The catalyst may also be presulfided outside the reactor, suitably passivated and then loaded into the reactor.

Ex-situ sulfiding may be accomplished using any of the known techniques described in literature. If sufficient amount of sulfur is incorporated into the catalyst using one of these ex-situ presulfiding techniques, activation of the catalyst might be accomplished by heating the catalyst in hydrogen flow in the reactor itself.

The product of the selective HDS is substantially desulfurized naphtha retaining high olefins content, and sulfur products consisting essentially of hydrogen sulfide. Generally, the desulfurized naphtha has a substantially reduced concentration, generally less than about 20% and preferably less than about 10% of the original thiohydrocarbon concentration present in the charge naphtha feedstock. The olefin content in the product desulfurized naphtha is generally at least about 50 v % and typically about 50–80 v % or higher, of the olefin content originally present in the naphtha feedstock. The desulfurized naphtha thereby retains a significant octane value as compared with the original octane value of the naphtha.

The hydrogen sulfide may be removed from the product desulfurized naphtha using any effective procedure including those presently known in the art. Typical sulfur removing procedures include, among others: gas sparging, such as with hydrogen or nitrogen; caustic scrubbing; amine treating; sorption; flashing or the like, in addition to the conventional gas-liquid separation.

Desulfurized naphtha containing very low sulfur content can be produced by the process of the present invention. Depending upon the initial sulfur content, feedstock, HDS conditions and other factors influencing sulfur removal, the desulfurized naphtha will generally have less than about 300, preferably less than about 200, and most preferably less than about 125 weight parts per million (wppm) sulfur.

Most of the diolefins and other gum forming components present in the charge naphtha are also substantially eliminated during the process of this invention, thereby increasing the storage stability. In most cases, the product desulfurized naphtha may be water-white in color.

DESCRIPTION OF PREFERRED EMBODIMENTS

Practice of the process of this invention will be apparent to those skilled in the art from the following wherein all parts are parts by weight unless otherwise stated. An asterisk (*) indicates a control example.

EXAMPLE I* (COMPARATIVE EXAMPLE)

In this Control Example, the catalyst was prepared by adopting the general procedure described in U.S. Pat. No. 5,423,976 incorporated by reference herein in its entirety. It was prepared by impregnating to incipient wetness 40 parts of Carbon A of Table 4 in the form of 0.8 mm extrudates, with 29.5 parts of deionized water containing 3.6 parts of AHM Ammonium heptamolybdate.$4H_2O$ and 0.7 parts of anhydrous potassium carbonate. After heating in air at 125° C. for 24 hours and cooling to ambient temperature, the material was impregnated to incipient wetness by contact with 27 parts of deionized water containing 4.5 parts of cobalt nitrate.$6H_2O$. The resulting material was heated in air at 125° C. for 24 hours and is cooled to ambient temperature. The final catalyst, which we shall refer to as Catalyst-I*, contains nominally 4 wt % Mo, 1 wt % K, and 2 wt % Co.

EXAMPLE II

In Example II, the catalyst was prepared by impregnating to incipient wetness 40 parts Carbon A of the Table 4 in the form of 0.8 mm extrudates with 30 parts of deionized water containing 3.6 parts of ammonium heptamolybdate.$4H_2O$ and 0.7 parts of anhydrous potassium carbonate. After heating in air at 130° C. for 24 hours and cooling to ambient temperature, the material was impregnated to incipient wetness by contact with 27 parts of deionized water containing 4.5 parts of cobalt (II) nitrate.$6H_2O$ and 3.4 parts of copper (II) nitrate.$3H_2O$. The resulting material was heated in air at 130° C. for 24 hours and cooled to ambient temperature. The final catalyst, which we shall refer to as Catalyst-II, contains nominally 4 wt % Mo, 1 wt % K, 2 wt % Cu, and 2 wt % Co.

EXAMPLE III

In Example III, the catalyst was prepared by impregnating to incipient wetness 80 parts Carbon A of the Table 4 in the form of 0.8 mm extrudates with 60 parts of deionized water containing 7.2 parts of ammonium heptamolybdate.$4H_2O$ and 1.4 parts of anhydrous potassium carbonate. After heating in air at 125° C. for 80 hours and cooling to ambient temperature, one half of the material was impregnated to incipient wetness by contact with 30 parts of deionized water containing 4.5 parts of cobalt (II) nitrate.$6H_2O$ and 6.8 parts of copper (II) nitrate.$3H_2O$. The resulting material was heated in air at 200° C. for 24 hours and was cooled to ambient temperature. The final catalyst, which we shall refer to as Catalyst-III, contains nominally 4 wt % Mo, 1 wt % K, 4 wt % Cu, and 2 wt % Co.

EXAMPLE IV

In Example IV, the catalyst was prepared by impregnating to incipient wetness 80 parts Carbon A of the Table 4 in the form of 0.8 mm extrudates with 60 parts of deionized water containing 7.2 parts of ammonium heptamolybdate.$4H_2O$ and 1.4 parts of anhydrous potassium carbonate. After heating in air at 125° C. for 80 hours and cooling to ambient temperature, one half of the material was impregnated to incipient wetness by contact with 30 parts of deionized water containing 4.5 parts of cobalt (II) nitrate.$6H_2O$ and 10.2 parts of copper (II) nitrate.$3H_2O$. The resulting material was heated in air at 200° C. for 24 hours and was cooled to ambient temperature. The final catalyst, which we shall refer to as Catalyst-IV, contains nominally 4 wt % Mo, 1 wt % K, 6 wt % Cu, and 2 wt % Co.

EXAMPLE V

In Example V, the catalyst was prepared by impregnating to incipient wetness 80 parts Carbon A of the Table 4 in the form of 0.8 mm extrudates with 60 parts of deionized water containing 7.2 parts of ammonium heptamolybdate.$4H_2O$ and 1.4 parts of anhydrous potassium carbonate. After heating in air at 125° C. for 80 hours and cooling to ambient temperature, one half of the material was impregnated to incipient wetness by contact with 30 parts of deionized water containing 4.5 parts of cobalt (II) nitrate.$6H_2O$ and 6.8 parts of copper (II) nitrate.$3H_2O$. The resulting material was heated in air at 200° C. for 24 hours, followed by heating in nitrogen flow at 500° C. for 3 hours and cooling to ambient temperature. The final catalyst, which we shall refer to as Catalyst-IV, contains nominally 4 wt % Mo, 1 wt % K, 4 wt % Cu, and 2 wt % Co.

CATALYST EVALUATION

The above-described catalysts were evaluated for their HDS and olefin hydrogenation (HYD) activities in a conventional hydrotreating reactor system using techniques well known to those familiar with the art. In a typical experiment, 25 cc of the catalyst is loaded into a 50 cm long stainless steel hydrotreating reactor of 21 mm inner diameter. It is heated by a four zone furnace, the temperature of each zone being controlled independently. A 6.4 mm O.D. stainless steel thermowell is placed axially throughout the length of the reactor, facilitating precise measurement of the temperature inside the catalyst bed at any point.

All the catalysts were presulfided before contacting the cracked naphtha feed. After purging off of oxygen from the reactor, 200 cc/min of a sulfiding gas consisting of 10 v % $H_2S$ in hydrogen is passed through the catalyst bed for 15 min at room temperature at 1 atmosphere pressure. With the sulfiding gas flowing, the temperature of the catalyst bed is increased at 1° C./min to 350° C., and kept at the sulfidation temperature of 350° C. for 3 hours. The temperature of the reactor is then lowered to the reaction temperature, with the sulfiding gas still flowing. At this point, a back pressure of about 100 psig is applied to the reactor, and the cracked naphtha flow is started at the desired flow rate. Once the liquid passes beyond the catalyst bed, the flow of the sulfiding gas is cut off, the flow of pure hydrogen gas is started at the desired rate, and the reactor pressure is increased to 300 psig. The actual hydrotreating reaction is considered to have started at this point in time. The reactor effluent is condensed by passing it through a condenser maintained at about 5° C. in front of a high pressure gas liquid separator.

For each reaction condition, after about 20 hours on stream, 3 liquid product samples were collected for analysis at one hour intervals. Twenty hours was found be sufficient to attain steady state activities under the reaction conditions employed. One large sample was collected for measuring the octane numbers of the hydrotreated product at 5–8 hours on stream.

The catalysts were evaluated for processing a full range fluid catalytic cracked naphtha having the properties and composition shown in Table 6. Even though full range FC cracked naphtha was used to show the advantages of this invention, as described earlier, the present invention is applicable for processing other kinds of naphthas such as coker naphthas, in general is applicable for any naphthas which contain >5 v % olefin concentration.

TABLE 6

Properties of Full Range FC Cracked Naphtha

| PROPERTY | VALUE |
|---|---|
| API Gravity | 51.4° |
| D86 Distillation (Recovery = 98%) | |
| Initial Boiling Point (IBP) | 109° F. |
| 5% | 148° F. |
| 10% | 162° F. |
| 20% | 177° F. |
| 30% | 195° F. |
| 40% | 218° F. |
| 50% | 245° F. |
| 60% | 275° F. |
| 70% | 302° F. |
| 80% | 330° F. |
| 90% | 357° F. |
| 95% | 375° F. |
| End Point (EP) | 405° F. |
| Sulfur Content, wppm | 1600 |
| Nitrogen Content, wppm | <20 |
| Research Octane Number, RON | 91.5 |
| Motor Octane Number, MON | 80.9 |
| Olefin Content, v % | 27.8 |
| Aromatics Content, v % | 31.5 |

The sulfur concentrations of the feed and product samples were determined by the X-ray fluorescence (XRF) technique ASTM D2622. The product samples were carefully sparged ultrasonically at about 5° C. to remove the dissolved $H_2S$ prior to the XRF measurement. The concentration of olefins as volume % in the feed and product samples were measured by PIONA (Paraffins, Isoparaffins, Olefins, Naphthenes, Aromatics) technique using Gas Chromatography. The PIONA technique is widely used in the petroleum industry for this purpose.

The experimental results of various catalyst evaluations for the hydrodesulfurization of full range fluid catalytic (FC) cracked naphtha which distinguish the present invention are recorded in Table 7. Presented in Table 7 are the catalyst number and description, temperature of the catalyst bed in °C., product sulfur concentration in wppm, % HDS (hydrodesulfurization), % HYD (olefins hydrogenated) during the catalytic process, and the "Selectivity Factor", defined as the ratio of Log[fraction sulfur remaining] to Log[fraction olefins remaining], which is a function of % HDS level.

TABLE 7

| Catalyst | Catalyst Description | Temp °C. | Prod. Sulfur (wppm) | % HDS | % HYD of Olefins | Selectivity Factor |
|---|---|---|---|---|---|---|
| I* | Co—Mo—K/Carbon | 270 | 361 | 77.4 | 15.1 | 9.2 |
| | | 285 | 139 | 91.3 | 26.6 | 7.9 |
| | | 285 | 99 | 93.8 | 41.8 | 5.0 |
| II | Cu—Co—Mo—K/ Carbon 2 wt % Cu, 130° C.-Air | 270 | 353 | 74.2 | 10.3 | 11.6 |
| | | 286 | 184 | 86.6 | 18.3 | 9.0 |
| | | 300 | 106 | 92.3 | 26.3 | 8.5 |
| III | Cu—Co—Mo—K/Carbon 4 wt % Cu, 200° C.-Air | 285 | 255 | 84.1 | 22.2 | 7.3 |
| | | 300 | 98 | 93.9 | 27.6 | 8.7 |
| V | Cu—Co—Mo—K/Carbon 4 wt % Cu, 500° C.-Nitrogen | 285 | 130 | 91.9 | 36.3 | 5.6 |
| | | 300 | 72 | 95.5 | 49.1 | 4.6 |
| IV | Cu—Co—Mo—K/Carbon 6 wt % Cu, 125° C.-Air | 300 | 170 | 89.4 | 22.5 | 9.2 |

Notes for Table 7:
a) Feed for all the experiments was the full range naphtha, the properties of which are listed in Table 6.
b) Experimental conditions for all experiments: Total Pressure = 300 psig; Hydrogen flow rate = 2000 SCFB (Standard cubic feet per barrel); LHSV (Liquid Hourly Space Velocity) = 4.0
c) Catalysts were presulfided in situ at 350° C. using 10 v % $H_2S$ in $H_2$.
d) All the activities are reported on equal catalyst volume basis.
e) "Selectivity Factor" is defined as the ratio of Log [fraction sulfur remaining] to Log [fraction olefins remaining], and it is a function of % HDS.

A careful observation of the results presented in Table 7 reveals the following:

1. The copper containing catalysts of the present invention, though slightly less active for the hydrodesulfurization of cracked naphtha, are more selective, especially at high % HDS level of >90%, for the selective HDS of fluid catalytic cracked naphtha, when compared to the carbon supported Co-Mo-K catalyst of related U.S. Pat. No. 5,423,976, which does not contain copper, at same or similar % HDS level.
2. Copper-containing catalysts which underwent heating in air at 125° C. or at 200° C. show significantly higher selectivity for selective HDS of fluid catalytic cracked naphtha, compared to the catalyst that is heat treated in nitrogen flow at 500° C.
3. The Best Mode is believed to be that of Example II or of Example III, where the performance is about the same for the selective HDS of fluid catalytic cracked naphtha.

Although this invention has been illustrated by reference to specific embodiments, it will be apparent to those skilled in the art that various changes and modifications may be made which clearly fall within the scope of the invention.

What is claimed:

1. A process for treating a charged cracked naphtha containing olefinic components and undesired sulfur which comprises:

maintaining a bed of sulfided catalyst containing (1) at least one metal of non-noble group VIII and (ii) at least one metal of group VI-B, and (iii) one or more metals selected from the group consisting of Group I-A, II-A, III-B, and the lanthanide series, and (iv) at least one metal of Group I-B, on a carbon support;

passing the charge cracked naphtha containing olefinic components and undesired sulfur into contact with said catalyst in the presence of a gas selected from pure hydrogen and a gas mixture comprising greater than 60% by volume of hydrogen, maintaining the charge cracked naphtha containing olefinic components and undesired sulfur in contact with said catalyst at hydrosulfurizing conditions thereby effecting hydrodesulfurization of said charge cracked naphtha containing olefinic components and undesired sulfur and forming a product stream of desulfurized naphtha containing a decreased content of sulfur and also containing at least 50% of the olefinic content of the charge cracked naphtha, and recovering said product stream of cracked naphtha containing a decreased content of sulfur.

2. The process for treating a charge cracked naphtha as claimed in claim 1 wherein said charge is a naphtha from a catalytic cracking unit.

3. The process for treating a charge cracked naphtha as claimed in claim 1 wherein said charge is a naphtha from a coking unit.

4. The process for treating a charge cracked naphtha as claimed in claim 1 wherein said charge is a naphtha from a visbreaker unit.

5. The process for treating a charge cracked naphtha as claimed in claim 1 wherein said charge naphtha is a pyrolysis naphtha.

6. The process for treating a charge cracked naphtha as claimed in claim 1 wherein said charged naphtha is a steam cracker effluent naphtha.

7. The process for treating a charge cracked naphtha as claimed in claim 1 wherein said charge naphtha is a catalytic cracker effluent naphtha, a thermal cracker effluent naphtha, a coker effluent naphtha, a visbreaker effluent naphtha, a steam cracker effluent naphtha or a mixture thereof.

8. The process for treating a charge cracked naphtha as claimed in claim 1 wherein said charge naphtha is selected from the group consisting of light naphtha, full range naphtha, heavy naphtha, or mixtures thereof.

9. The process for treating a charge cracked naphtha as claimed in claim 1 wherein said charged naphtha is supplemented with higher than naphtha boiling range distillate feedstocks to form a mix feed for the process.

10. The process for treating a charge cracked naphtha as claimed in claim 1 wherein said catalyst contains potassium as the Group I-A metal and copper as the Group I-B metal.

11. The process for treating a charge cracked naphtha as claimed in claim 1 wherein said catalyst contains calcium as the Group II-A metal.

12. The process for treating a charge cracked naphtha as claimed in claim 1 wherein said catalyst contains Group I-A metal and Group II-A metal in amount of 0.01–20 wt %.

13. The process for treating a charge cracked naphtha as claimed in claim 1 wherein said catalyst contains cobalt as the Group VIII metal.

14. The process for treating a charge cracked naphtha as claimed in claim 1 wherein said catalyst contains molybdenum as the Group VI-B metal.

15. The process for treating a charge cracked naphtha as claimed in claim 1 wherein said catalyst contains copper as the Group I-B metal.

16. The process for treating a charge cracked naphtha as claimed in claim 1 wherein said catalyst contains Group VIII metal in amount of 0.1–15 wt %.

17. The process for treating a charge cracked naphtha as claimed in claim 1 wherein said catalyst contains Group VI-B metal in amount of 0.1–40 wt %.

18. The process for treating a charge cracked naphtha as claimed in claim 1 wherein said catalyst contains copper as the Group I-B metal in amount of 0.01–10 wt %.

19. The process for treating a charge cracked naphtha as claimed in claim 1 wherein said carbon supported catalyst contains (i) 0.01–20 wt. % of at least one metal selected from the group consisting of Group I-A, II-A metal and the lanthanide series, (ii) 0.1–15 wt. % of at least one Group VIII metal, (iii) 0.01–10 wt. % of at least one group I-B metal, and (iv) 0.1–40 wt. % of at least one Group VI-B metal.

\* \* \* \* \*